(No Model.) 3 Sheets—Sheet 1.
H. P. OSBORN.
VEHICLE WHEEL.
No. 601,324. Patented Mar. 29, 1898.
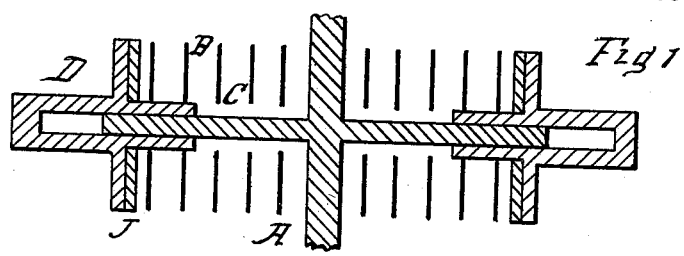
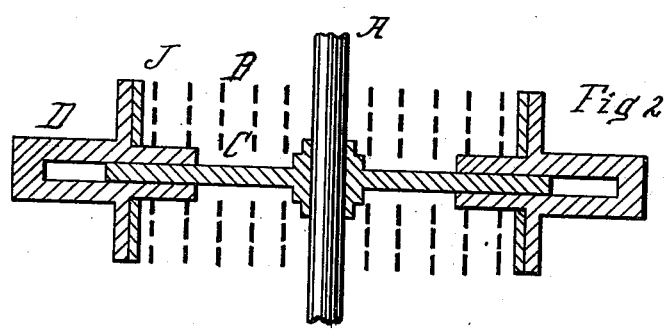
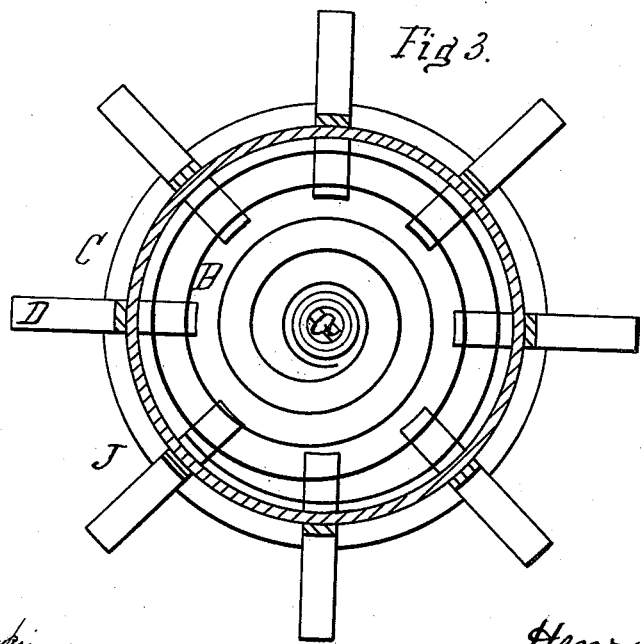
WITNESSES:
Wilfred Atkinson
W. H. Horsman
INVENTOR
Henry P. Osborn

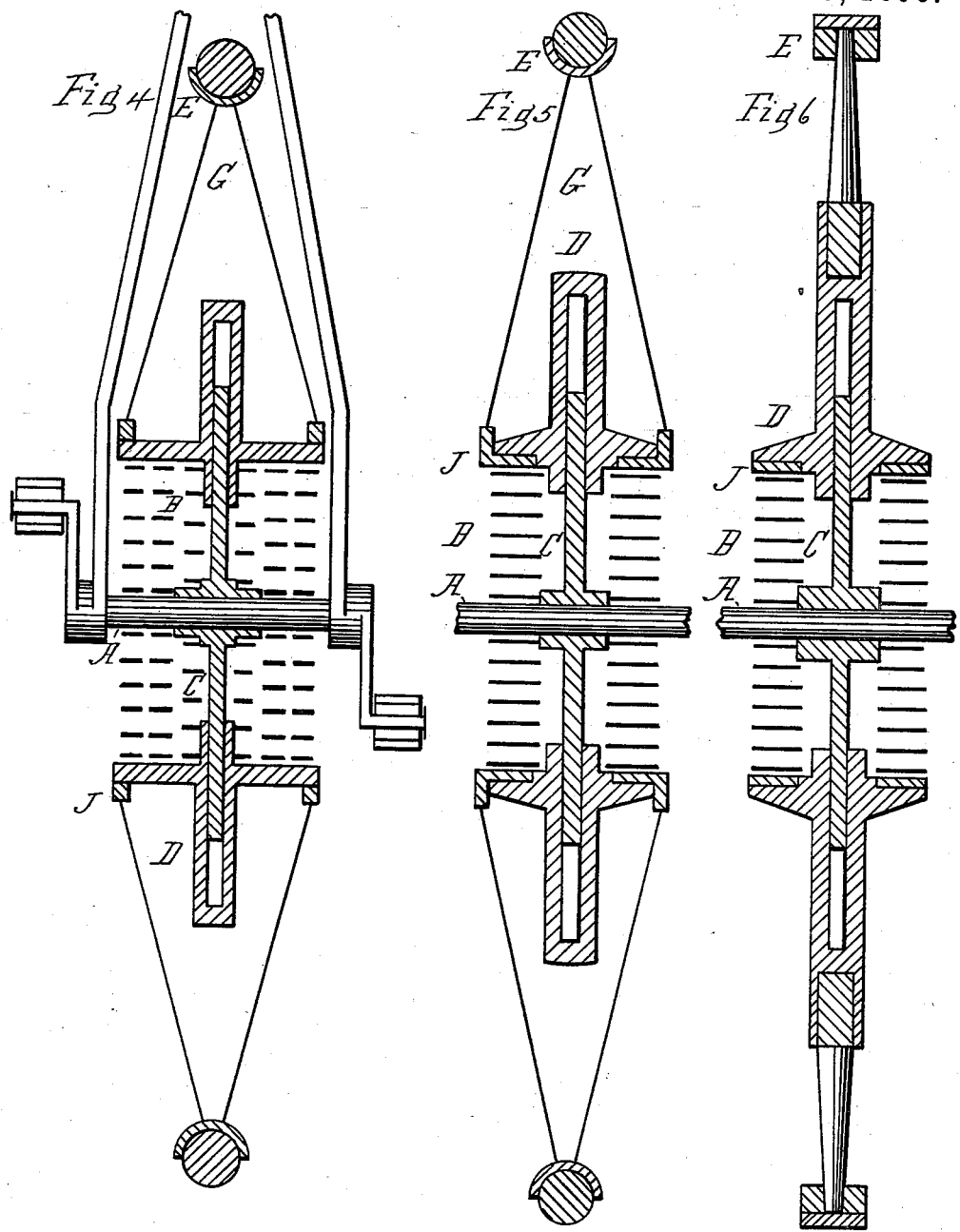

(No Model.) 3 Sheets—Sheet 3.
H. P. OSBORN.
VEHICLE WHEEL.
No. 601,324. Patented Mar. 29, 1898.
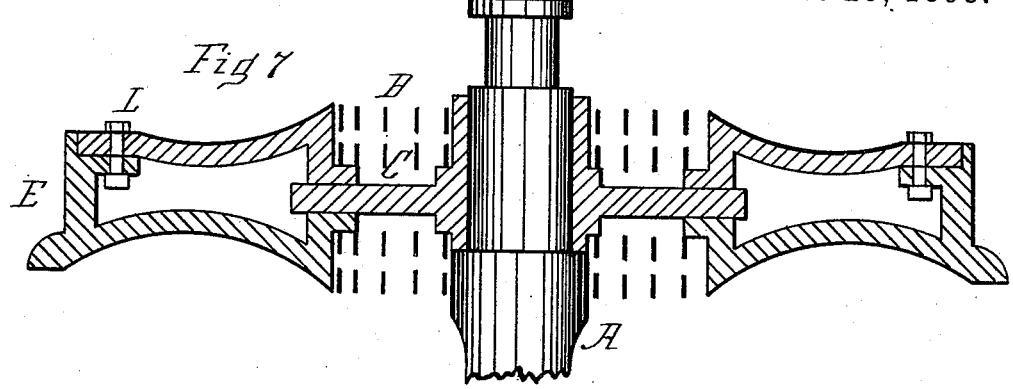
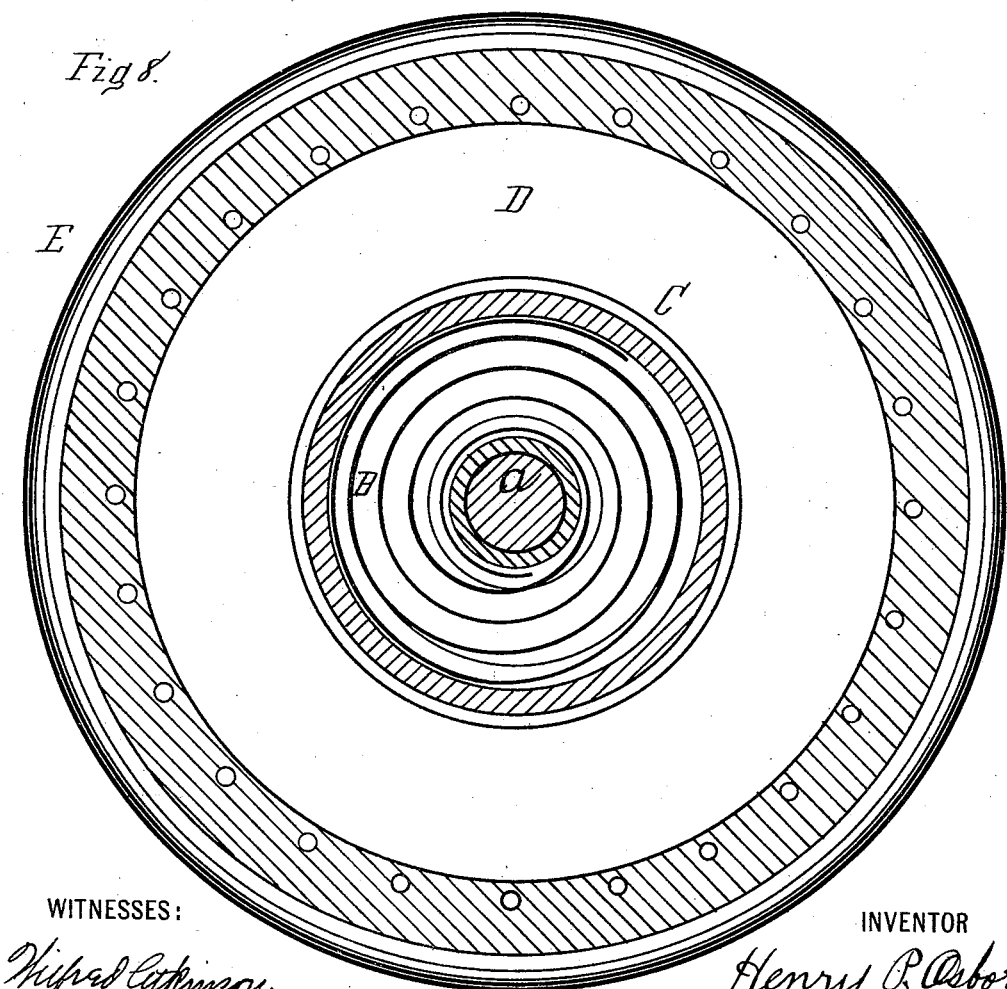
WITNESSES:
INVENTOR
Henry P. Osborn

UNITED STATES PATENT OFFICE.

HENRY P. OSBORN, OF NEW YORK, N. Y.

VEHICLE-WHEEL.

SPECIFICATION forming part of Letters Patent No. 601,324, dated March 29, 1898.

Application filed September 7, 1893. Serial No. 485,019. (No model.)

*To all whom it may concern:*

Be it known that I, HENRY PORTER OSBORN, a citizen of the United States, residing at New York, in the county of New York and State of New York, have invented new and useful Improvements in Hubs and Wheels, of which the following is a specification.

My invention relates to improvements in hubs and wheels in which a spirally-wound spring or springs operates, in conjunction with an axle or inner part and with an outer spring-incasing part, to lessen the vibration of the axle or inner part; and the objects of my improvement are, first, to provide in machines for conveying purposes a spring connection between the axle and the wheel; second, to allow the wheel to have spring play at right angles with the axis of the axle; third, to hold the wheel in an upright position and prevent its wabbling; fourth, to provide a wheel for cars, wagons, unicycles, bicycles, tricycles, or other riding-machines that will lessen the jar of transit; fifth, to furnish in military cycles a bullet-shield behind which the soldier may protect himself from the fire of the enemy. I attain these objects by the mechanisms illustrated in the accompanying drawings, in which—

Figure 1 is a simple construction of the axle and flange-guide of one piece. Fig. 2 is the same construction of spring-hub with the axle and flange-guide made separate. Fig. 3 is a vertical section through Fig. 2. Fig. 4 is a cycle-wheel with its hub of the above construction. Fig. 5 is another cycle-wheel with similar construction of hub. Fig. 6 is the same construction of hub applied to a carriage-wheel. Fig. 7 is the same applied to a car-wheel. Fig. 8 is a sectional view of Fig. 7.

Similar letters refer to similar parts throughout the several views.

The invention is shown in about its simplest form in Figs. 1, 2, and 3 and in its modifications and applications in Figs. 4, 5, 6, 7, and 8. The construction of the axle and flange-guide of one piece of metal, which gives strength and lightness, (shown in Fig. 1,) is a distinct invention, new, and not disclosed by the previous state of the art.

The construction of a centrally-arranged disk-guide or flange-guide, which may also serve for the purpose of protection in military cycles—that is, a guide arranged between the springs or similar cushioning appliance—deserves a full description. The size of the flange-guide may be varied to suit the requirements of the wheel for which it is made without any change in the hub except as to size of the respective parts. In light racing-cycles it is expected that this central disk-guide will be made both small and light, even hollow where extreme lightness is required; but in car-wheels it will have to be heavy and strong and in cycles for military purposes it will have to be made very large to cover the soldier when crouching behind the wheel. It is well to construct it of bullet-proof material, forming, as it were, movable breastworks, behind which the soldier may securely engage the enemy.

Throughout the several views, A represents the axle part; B, the spring part; C, the centrally-arranged flange-like disk-guide; D, the rim part; E, the tire of the wheels; J, the section connecting rim-securing bands; G, spokes.

The peculiar construction of the rim part D deserves a full description, as it is a leading feature of my invention. In Figs. 7 and 8 it is shown constructed of two pieces, one of which forms the tire or tread of the wheel. This form of construction is desirable in track-running wheels.

In wheels where lightness is a desirable feature, as is the case in carriage-wheels, and especially in bicycle-wheels (shown in Figs. 1, 2, 3, 4, 5, and 6) constructed for road purposes, I make the rim part D of a number of sections, which are held together by connecting-bands J. These sections have projections extending toward the axle, projections extending from the axle, and projections extending parallel with the axle. They are slotted, said slots opening toward the axle to receive the flange-guide and allow of its play therein.

The spring B is sufficiently described by stating that it is a helically-wound spiral spring which has spring-bearing at its inner coils on the axle A and at its outer coils on the rim part D, and forms a spiral-spring connection with the axle. Although a helically-wound spring is here shown, (it being deemed the best,) any form of spring or other cushioning material device may be used on both sides of the flange-guide. The function of the spring is to prevent or lessen jar at the axle by affording spring connection with the hub.

The function of the flange-guide C is to hold the wheel at right angles to the axle, thus preventing wabbling of the wheel.

The spokes have connection with the rim part D. The slot in the pieces or sections of the rim allow of the play of the flange-guide C. The result is a spring play at right angles to the axle, but no play laterally—that is, no wabbling motion.

I am aware that prior to my application for a patent traction-engines have been made with a pair of spring-incasing flange-guides to prevent the wheel from wabbling; but I am not aware of the use of a single centrally-located flange-guide in any riding-machine for the purposes herein set forth. I do not, therefore, broadly claim a spring-sustained rim prevented from wabbling by being held between a pair of flange-guides, as has been the practice heretofore; but What I do claim, and desire to secure by Letters Patent, is—

1. In a hub for wheels, the combination of centrally-arranged disk-guide and laterally-arranged springs.

2. In a hub for wheels, the combination of a centrally-arranged disk-guide and a sectionally-constructed rim.

3. In a hub for wheels, the combination of a centrally-arranged disk-guide and an encompassing rim which has spring play against the sides of the disk-guide.

4. In a hub for wheels, the combination of a centrally-arranged disk-guide, a rim guided by said disk, and an axle sustaining said disk.

5. In a hub for wheels, the combination of an axle part, a centrally-arranged guide part, and spiral springs located on the sides of said guide part.

6. In a hub for wheels, the combination of an axle part, a centrally-arranged guide part, spiral springs located laterally with the guide part, and a spring-incasing rim.

7. In a hub for wheels, the combination of an axle part, a centrally-arranged guide part, spiral springs located laterally with the guide part, a spring-incasing rim having projections extending from the hub, and having projections extending parallel with the axle.

8. In a hub for wheels, the combination of an axle part, a centrally-arranged guide part, spiral springs located on both sides of the central guide part, a spring-incasing rim part composed of sections, said sections having projections extending from the hub, and having projections extending parallel with the axle, and having projections extending toward the axle, and having a slot opening toward the axle, to accommodate the flange-guide.

9. In a hub for wheels, the combination of an axle part, a centrally-arranged guide part, spiral springs located on both sides of the central guide part, a spring-incasing rim part composed of sections, said sections having projections extending away from the hub, and having projections extending parallel with the axle, and having projections extending toward the axle and having a slot opening toward the axle to accommodate the flange-guide, and a section-connecting piece or band.

In testimony that I claim the invention above set forth I affix my signature in presence of two witnesses.

HENRY P. OSBORN.

Witnesses:
JOHN T. ARMS,
SAML. A. DRURY.